United States Patent
Wooldridge et al.

(10) Patent No.: US 7,825,852 B2
(45) Date of Patent: Nov. 2, 2010

(54) SIMULTANEOUS CALIBRATION AND COMMUNICATION OF ACTIVE ARRAYS OF A SATELLITE

(75) Inventors: John J. Wooldridge, Manhattan Beach, CA (US); Patrick Kevin Bailleul, Whittier, CA (US)

(73) Assignee: The Boeing Company, Chicago, IL (US)

( * ) Notice: Subject to any disclaimer, the term of this patent is extended or adjusted under 35 U.S.C. 154(b) by 87 days.

(21) Appl. No.: 12/363,297

(22) Filed: Jan. 30, 2009

(65) Prior Publication Data

US 2010/0194624 A1 Aug. 5, 2010

(51) Int. Cl.
*G01S 7/40* (2006.01)
(52) U.S. Cl. ...................... 342/165; 342/174
(58) Field of Classification Search .......... 342/165–174
See application file for complete search history.

(56) References Cited

U.S. PATENT DOCUMENTS

| | | | |
|---|---|---|---|
| 5,771,019 A * | 6/1998 | Wachs et al. | 342/442 |
| 5,861,843 A | 1/1999 | Sorace et al. | |
| 2008/0216128 A1* | 9/2008 | Park | 725/68 |

* cited by examiner

*Primary Examiner*—Thomas H Tarcza
*Assistant Examiner*—Timothy A Brainard
(74) *Attorney, Agent, or Firm*—Klintworth & Rozenblat IP LLC

(57) ABSTRACT

An apparatus for simultaneous calibration and communication of active arrays of a satellite may include a base transmitter, a satellite receiver, a satellite transmitter, a base receiver, and at least one computer. The apparatus may simultaneously transmit and receive a calibration carrier and a communication carrier at different frequencies in order to calibrate the apparatus using the calibration carrier without interrupting the communication carrier. The use of different frequencies may avoid interference between the calibration and communication carriers.

20 Claims, 2 Drawing Sheets

SIMULTANEOUS CALIBRATION AND COMMUNICATION OF ACTIVE ARRAYS OF A SATELLITE

BACKGROUND OF THE DISCLOSURE

In many conventional satellites, in order to calibrate the satellite, the communication carrier being received and transmitted by the satellite must be temporarily shut-down in order to calibrate the satellite. This disrupts communication, takes time, and adds cost.

An apparatus and method is needed which may solve one or more problems of one or more conventional satellites.

SUMMARY OF THE DISCLOSURE

In one aspect of the disclosure, an apparatus for simultaneous calibration and communication of active arrays of a satellite is disclosed. The apparatus may include a base transmitter, a satellite receiver, a satellite transmitter, a base receiver, and at least one computer. The base transmitter may comprise a first antenna for simultaneously transmitting a calibration carrier having a first frequency and a communication carrier having a different second frequency to the satellite receiver. The satellite receiver may comprise a second antenna comprising a first active array for simultaneously receiving the calibration carrier and the communication carrier transmitted from the base transmitter, and for simultaneously transmitting the calibration carrier and the communication carrier to the satellite transmitter. The satellite transmitter may comprise a third antenna comprising a second active array for simultaneously receiving the calibration carrier and the communication carrier transmitted from the satellite receiver, and for simultaneously transmitting the calibration carrier and the communication carrier to the base receiver. The base receiver may comprise a fourth antenna for simultaneously receiving the calibration carrier and the communication carrier transmitted from the satellite transmitter. The at least one computer may be adapted to calibrate the first and the second active arrays based on data received from the calibration carrier. The at least one computer may be adapted to determine a correction factor based on the differences in frequency of the first frequency and the second frequency. The at least one computer may be adapted to calibrate the communication carrier by applying the correction factor to data received from the calibration carrier.

In another aspect of the disclosure, a method is disclosed for simultaneously calibrating active arrays of a satellite without shutting down communication of the active arrays. In one step, a calibration carrier having a first frequency and a communication carrier having a different second frequency may be simultaneously transmitted from a base transmitter comprising a first antenna to a satellite receiver comprising a second antenna including a first active array. In another step, the satellite receiver may simultaneously receive the calibration carrier and the communication carrier transmitted from the base transmitter. In an additional step, the calibration carrier and the communication carrier may be simultaneously transmitted from the satellite receiver to a satellite transmitter comprising a third antenna including a second active array. In still another step, the satellite transmitter may simultaneously receive the calibration carrier and the communication carrier transmitted from the satellite receiver. In an additional step, the satellite transmitter may simultaneously transmit the calibration carrier and the communication carrier to a base receiver comprising a fourth antenna. In another step, the base receiver may simultaneously receive the calibration carrier and the communication carrier transmitted from the satellite transmitter. In still another step, the first and the second active arrays may be calibrated, using at least one computer, based on data received from the calibration carrier. In an additional step, the communication carrier may be calibrated by applying a correction factor using the at least one computer, based on the differences in frequency of the first frequency and the second frequency, to data received from the calibration carrier.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
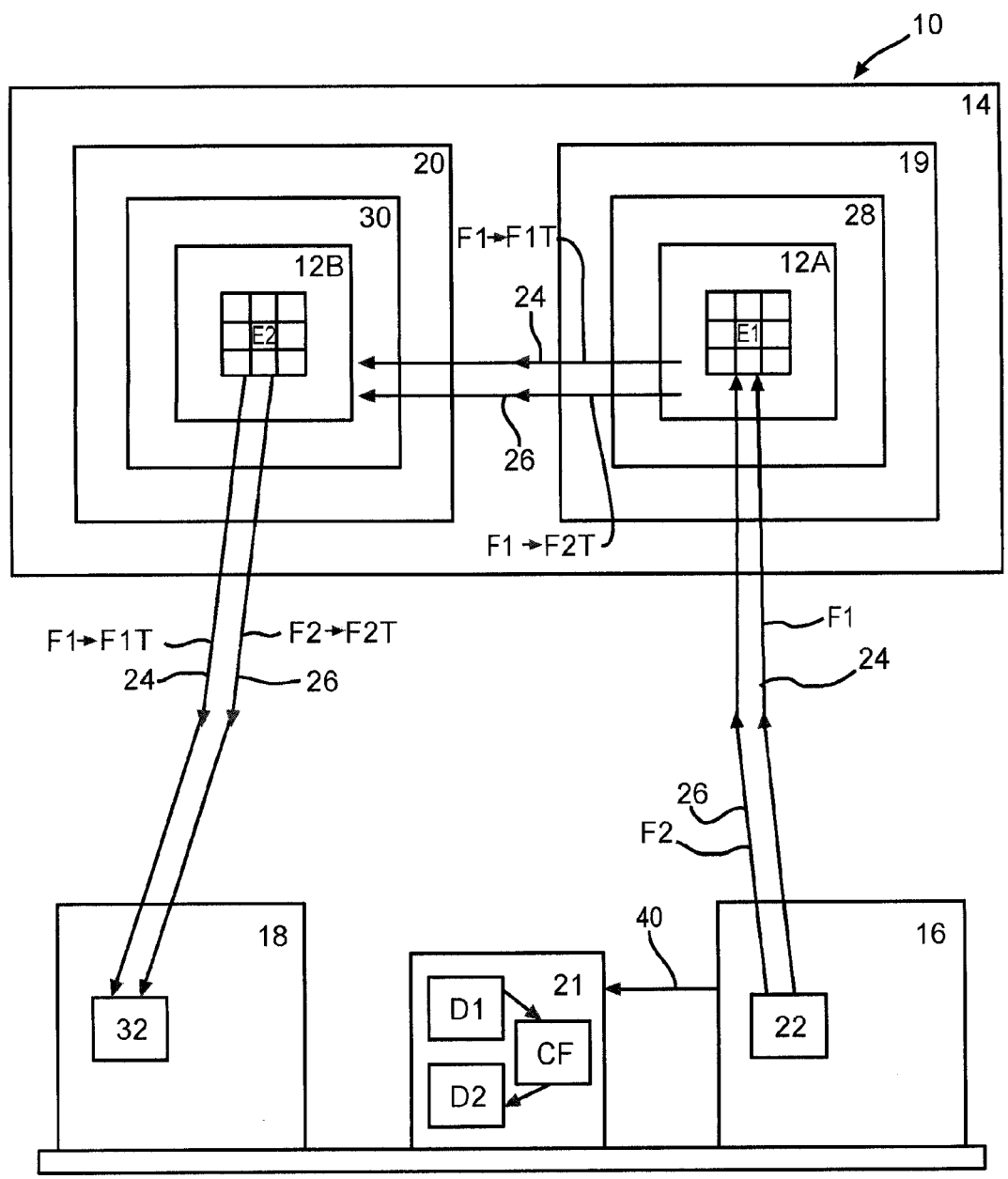
FIG. 1 is a box diagram showing an apparatus for simultaneous calibration and communication of active arrays of a satellite.

FIG. 1 is a box diagram showing an apparatus 10 for simultaneous calibration and communication of active arrays 12A and 12B of a satellite 14. The apparatus 10 may comprise a base transmitter 16, a base receiver 18, a satellite receiver 19, a satellite transmitter 20, and at least one computer 21. The base transmitter 16 may comprise a first antenna 22 which may simultaneously transmit a calibration carrier 24 having a first frequency F1 and a communication carrier 26 having a different second frequency F2 to the satellite receiver 19. The calibration carrier 24 may comprise a single calibration signal. The communication carrier 26 may comprise a plurality of communication signals. In one embodiment, the communication carrier 26 may comprise eleven different communication signals. In other embodiments, the calibration and communication carriers 24 and 26 may have varying numbers of signals.

The base transmitter 16 may comprise a ground-based transmitter. In other embodiments, the base transmitter 16 may be located in varying locations. The satellite receiver 19 may comprise a second antenna 28 comprising the first active array 12A. The first active array 12A may comprise a plurality of elements E1. In one embodiment, the first active array 12A may comprise three-hundred elements. Each of the elements E1 may comprise an amplifier, a five-bit phaser, and a five-bit attenuator. In other embodiments, the first active array 12A may comprise varying numbers and types of elements. The first active array 12A may simultaneously receive the calibration carrier 24 and the communication carrier 26 transmitted from the base transmitter 16. The first active array 12A may simultaneously transmit the calibration carrier 24 and the communication carrier 26 received from the base transmitter 16 to the satellite transmitter 20.

The satellite transmitter 20 may comprise a third antenna 30 comprising the second active array 12B. The second active array 12B may comprise a plurality of elements E2. In one embodiment, the second active array 12B may comprise three-hundred elements. Each of the elements E2 may comprise an amplifier, a five-bit phaser, and a five-bit attenuator. In other embodiments, the second active array 12B may comprise varying numbers and types of elements. The second active array 12B may simultaneously receive the calibration carrier 24 and the communication carrier 26 transmitted from the satellite receiver 19. The satellite transmitter 20 may simultaneously transmit the calibration carrier 24 and the communication carrier 26 received from the satellite receiver 19 to the base receiver 18. The satellite transmitter 20 may have a different frequency than a frequency of the satellite receiver 19. In one embodiment, the satellite transmitter 20 may have a frequency of 12 GHz and the satellite receiver 19 may have a frequency of 13 GHz. In other embodiments, the frequencies of the satellite transmitter 20 and the satellite receiver 19 may vary. The base receiver 18 may comprise a fourth antenna 32 which may simultaneously receive the calibration carrier 24 and the communication carrier 26 transmitted from the satellite transmitter 20. For the purposes of ease of tracing the calibration carrier 24 and communication carrier 26 through the communication apparatus 10, the calibration carrier 24 having the first frequency F1 and the communication carrier 26 having the second frequency F2 are designated to be constant in FIG. 1. In fact, the first and second frequencies F1 and F2 from the base transmitter 16 may be received by the first active array 12A and then translated by down-conversion to the second active array 12B to a new set of translated frequencies F1T and F2T. The converted frequencies F1T and F2T may be amplified by the third antenna 30 and received by the base receiver 18. The correction factor CF may be applied to the original transmit frequencies F1 and F2 and separately to the translated frequencies F1T and F2T. Hence the correction factor CF may be used twice, once for the second antenna 28 and once for the third antenna 30.

The at least one computer 21 may calibrate the first and the second active arrays 12A and 12B based on data D1 received from the calibration carrier 24. The elements E2 of the third antenna 30 may be calibrated by changing the phase of a single element by 180 degrees on command from computer 21. The elements E1 in the second antenna 28 may remain in a stationary mode (no phase or amplitude change), while the elements E2 may be calibrated one at a time. The calibration may comprise comparing the phase and amplitude of the elements E2 relative to the phase and amplitude of the calibration carrier 24. Each of the elements E2 may be calibrated one at a time until all of the elements E2 are calibrated to be in relative phase and amplitude to the calibration carrier 24. The elements E1 in the second antenna 28 may be calibrated with the elements E2 in the third antenna 30 in a stationary mode. Each of the elements E1 may be calibrated by changing their phase by 180 degrees. The sum of the calibration carrier 24 and a single element in elements E1 may be routed to the third antenna 30 whose elements may all be in a stationary mode (no phase or amplitude changes). Third antenna 30 may transmit the sum of the calibration carrier 24 and a single element phase change from elements E1 that are commanded by computer 21. The calibration carrier 24 and the communication carrier 26 transmitted to the second antenna 28 may be translated to a different frequency by the third antenna 30. The at least one computer 21 may receive timing signals 40 from the first antenna 22 in order to ascertain the elements E1 and E2 that are being calibrated with the calibration carrier 24. The computer 21 may have a stored table of correction factors CF for each element in elements E1 and E2 that may allow the calibration data in D1 to be corrected to the calibration carrier data at frequency F1 to be applied to the communication carrier 26 at frequency F2. The magnitude of the correction factor CF may be dependent on the magnitude of the frequency difference between the calibration carrier 24 and the communication carrier 26. For frequency differences of less than 100 KHz, the correction factor CF may be ignored for most cases. The at least one computer 21 may calibrate the communication carrier 26 to be in phase with the elements E1 and E2 of the first and the second active arrays 12A and 12B. Due to the differences in frequencies F1 and F2 of the calibration and communication carriers 24 and 26, and the resulting lack of interference between them, the at least one computer 21 may do any of the above-referenced calibrations while running the communication carrier 26 continuously without having to shut the communication carrier 26 down.

Figure 2:
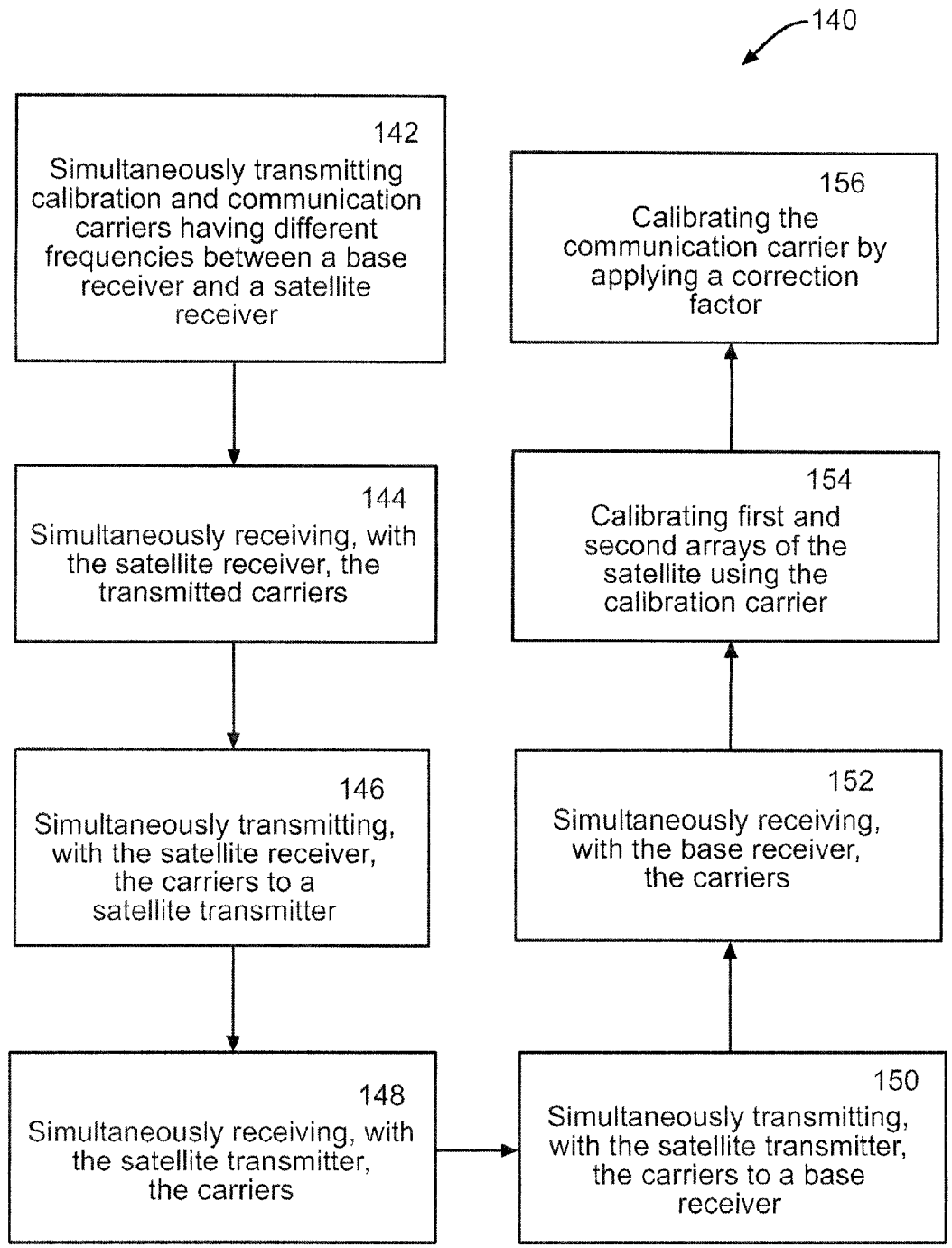
FIG. 2 is a flowchart of one embodiment of a method for simultaneously calibrating active arrays of a satellite without shutting down communication of the active arrays.

FIG. 2 is a flowchart of one embodiment of a method 140 for simultaneously calibrating active arrays 12A and 12B of a satellite 14 without shutting down communication of the active arrays 12A and 12B. In step 142, a calibration carrier 24 having a first frequency F1 and a communication carrier 26 having a different second frequency F2 may be simultaneously transmitted from a base transmitter 16 to a satellite receiver 19. The calibration carrier 24 may comprise a single calibration signal. The communication carrier 26 may comprise a plurality of communication signals. In one embodiment, the communication carrier 26 may comprise eleven different communication signals. In other embodiments, the calibration and communication signals 24 and 26 may have varying numbers of signals. The base transmitter 16 may comprise a first antenna 22. The base transmitter 16 may comprise a ground-based transmitter. In other embodiments, the base transmitter 16 may vary in type and location. For example, a separate base transmitter 16 and base receiver 18 may be utilized for the communication carrier 26 while another base transmitter 16 and base receiver 18 at a different location may be utilized for the calibration carrier 24. The only consideration may be that both locations must be in the receive and transmit patterns of the active arrays 12A and 12B.

The satellite receiver 19 may comprise a second antenna 28 comprising the first active array 12A. The first active array 12A may comprise a plurality of elements E1. In one embodiment, the first active array 12A may comprise three-hundred elements. Each of the elements E1 may comprise an amplifier, a five-bit phaser, and a five-bit attenuator. In other embodiments, the first active array 12A may comprise varying numbers and types of elements. In step 144, the satellite receiver 19 may simultaneously receive the calibration carrier 24 and the communication carrier 26 transmitted from the base transmitter 16.

In step 146, the satellite receiver 19 may simultaneously transmit the calibration carrier 24 and the communication carrier 26 received from the base transmitter 18 to a satellite transmitter 20. The satellite transmitter 20 may comprise a third antenna 30 comprising the second active array 12B. The second active array 12B may comprise a plurality of elements E2. In one embodiment, the second active array 12B may comprise three-hundred elements. Each of the elements E2 may comprise an amplifier, a five-bit phaser, and a five-bit attenuator. In other embodiments, the second active array 12B may comprise varying numbers and types of elements.

In step 148, the satellite transmitter 20 may simultaneously receive the calibration carrier 24 and the communication carrier 26 transmitted from the satellite receiver 19. In step 150, the satellite transmitter 20 may simultaneously transmit the calibration carrier 24 and the communication carrier 26 received from the satellite receiver 19 to a base receiver 18. The satellite transmitter 20 may have a different frequency than a frequency of the satellite receiver 19. In one embodiment, the satellite transmitter 20 may have a frequency of 12 GHz and the satellite receive 18 may have a frequency of 13 GHz. In other embodiments, the frequencies of the satellite transmitter 20 and the satellite receiver 19 may vary. The base receiver 18 may comprise a fourth antenna 32. The base receiver 18 may comprise a ground-based transmitter. In other embodiments, the base receiver 18 may vary in type and location. For example, a separate base receiver 18 and base transmitter 16 may be used for the communication carrier 26 at one location and another base receiver 18 and base transmitter 16 at another location may be used for the calibration carrier 24. In step 152, the base receiver 18 may simultaneously receive the calibration carrier 24 and the communication carrier 26 transmitted from the satellite transmitter 20.

In step 154, the first and the second active arrays 12A and 12B may be calibrated using at least one computer 21 based on data D1 received from the calibration carrier 24. Step 154 may comprise calibrating the plurality of elements E1 and E2 of each of the first and the second active arrays 12A and 12B to be in phase with the calibration carrier 24 in order to provide constructive interference. Step 154 may be done by calibrating, one at a time, each individual element of the plurality of elements E1 and E2 by blinking each individual element one at a time between 0 degrees and 180 degrees in order to calibrate each individual element one at a time.

In step 156, the communication carrier 26 may be calibrated by applying a correction factor CF using the at least one computer 21, based on the differences in frequencies of the first and second frequencies F1 and F2, to data D1 received from the calibration carrier 24. Step 156 may comprise calibrating the communication carrier 26 to be in phase with the plurality of elements E1 and E2 of each of the first and second active arrays 12A and 12B and/or to be in phase with the calibration carrier 24 in order to provide constructive interference. Due to the differences in frequencies F1 and F2 of the calibration and communication carriers 24 and 26, all of the steps of the method 140, including all calibration steps, may be done while the communication carrier 26 is running continuously without interference between the calibration and communication signals 24 and 26 and without having to shut-down the communication carrier 26.

In one embodiment, steps 154 and 156 may comprise calibrating the first active array 12A to be in phase with the calibration carrier 24, followed by calibrating the second active array 12B to be in phase with the calibration carrier 24, followed by applying the correction factor CF to the calibration carrier 24 to obtain so that the communication carrier 26 is in phase with each of the elements E1 of the first active array 12A, and the elements E2 of the second active array 12B.

One or more embodiments of the disclosure may allow for a satellite 14 to be calibrated without having to shut-down the communication carrier 26 being received and transmitted by the satellite 14. This may allow for continuous satellite communication, may save calibration time, may reduce calibration cost, and/or may reduce one or more other types of problems of one or more conventional satellites.

It should be understood, of course, that the foregoing relates to exemplary embodiments of the disclosure and that modifications may be made without departing from the spirit and scope of the disclosure as set forth in the following claims.

We claim:

1. An apparatus for simultaneous calibration and communication of active arrays of a satellite comprising:

a base transmitter comprising a first antenna for simultaneously transmitting a calibration carrier having a first frequency and a communication carrier having a different second frequency to a satellite receiver;

the satellite receiver comprising a second antenna comprising a first active array for simultaneously receiving the calibration carrier and the communication carrier transmitted from the base transmitter and for simultaneously transmitting the calibration carrier and the communication carrier to a satellite transmitter;

the satellite transmitter comprising a third antenna comprising a second active array for simultaneously receiving the calibration carrier and the communication carrier transmitted from the satellite receiver and for simultaneously transmitting the calibration carrier and the communication carrier to a base receiver;

the base receiver comprising a fourth antenna for simultaneously receiving the calibration carrier and the communication carrier transmitted from the satellite transmitter; and at least one computer for calibrating the first and the second active arrays based on data received from the calibration carrier, for determining a correction factor based on the differences in frequency of the first frequency and the second frequency, and for calibrating the communication carrier by applying the correction factor to data received from the calibration carrier.

2. The apparatus of claim 1 wherein the base transmitter comprises a ground transmitter and the base receiver comprises a ground receiver.

3. The apparatus of claim 1 wherein the calibration carrier comprises one calibration signal and the communication carrier comprises at least one of a plurality of communication signals and eleven communication signals.

4. The apparatus of claim 1 wherein at least one of the satellite transmitter comprises a different frequency than a frequency of the satellite receiver, the satellite transmitter comprises a frequency of 12 GHz, and the satellite receiver comprises a frequency of 13 GHz.

5. The apparatus of claim 1 wherein each of the first and the second active arrays comprise at least one of a plurality of elements and three-hundred elements.

6. The apparatus of claim 5 wherein each element of the first and the second active arrays comprises an amplifier, a five-bit phaser, and a five-bit attenuator.

7. The apparatus of claim 5 wherein the at least one computer is for at least one of calibrating the plurality of elements of each of the first and the second active arrays to be in phase with the calibration carrier, by calibrating the plurality of elements of each of the first and second active arrays to be in phase with the calibration carrier, for calibrating the communication carrier to be in phase by applying the correction factor to the calibration carrier, and for providing communication carrier calibration to provide constructive interference.

8. The apparatus of claim 1 wherein the at least one computer is for calibrating the first and the second active arrays, for calibrating the calibration carrier, for calibrating the communication carrier by applying the correction factor, and for doing all calibration while running the communication carrier continuously.

9. A method for simultaneously calibrating active arrays of a satellite without shutting down communication of the active arrays comprising:

simultaneously transmitting, from a base transmitter comprising a first antenna to a satellite receiver comprising a second antenna comprising a first active array, a calibration carrier having a first frequency and a communication carrier having a different second frequency;

simultaneously receiving with the satellite receiver the calibration carrier and the communication carrier transmitted from the base transmitter;

simultaneously transmitting the calibration carrier and the communication carrier from the satellite receiver to a satellite transmitter, comprising a third antenna comprising a second active array;

simultaneously receiving with the satellite transmitter the calibration carrier and the communication carrier transmitted from the satellite receiver;

simultaneously transmitting with the satellite transmitter the calibration carrier and the communication carrier to a base receiver comprising a fourth antenna;

simultaneously receiving with the base receiver the calibration carrier and the communication carrier transmitted from the satellite transmitter;

calibrating the first and the second active arrays, using at least one computer, based on data received from the calibration carrier; and calibrating the communication carrier by applying a correction factor using the at least one computer, based on the differences in frequency of the first frequency and the second frequency, to data received from the calibration carrier.

10. The method of claim 9 wherein the base transmitter comprises a ground transmitter and the base receiver comprises a ground receiver.

11. The method of claim 9 wherein the calibration carrier comprises one calibration signal and the communication carrier comprises at least one of a plurality of communication signals and eleven communication signals.

12. The method of claim 9 wherein at least one of the satellite transmitter comprises a different frequency than a frequency of the satellite receiver, the satellite transmitter comprises a frequency of 12 GHz, and the satellite receiver comprises a frequency of 13 GHz.

13. The method of claim 9 wherein each of the first and second active arrays comprise at least one of a plurality of elements and three-hundred elements.

14. The method of claim 13 wherein each of the elements of the first and the second active arrays comprises an amplifier, a five-bit phaser, and a five-bit attenuator.

15. The method of claim 13 wherein the calibrating the first and the second active arrays step comprises at least one of calibrating the plurality of elements of each of the first and the second active arrays to be in phase with each other to provide constructive interference, and calibrating the plurality of elements of each of the first and second active arrays to be in phase with the calibration carrier to provide constructive interference.

16. The method of claim 13 wherein the calibrating the communication carrier step comprises at least one of calibrating the communication carrier to be in phase with the plurality of elements of each of the first and the second active arrays to provide constructive interference, and calibrating the communication carrier by applying the correction factor to the calibration carrier to provide constructive interference for the communication carrier.

17. The method of claim 9 wherein the calibration steps are done while running the communication carrier continuously.

18. The method of claim 9 wherein the different frequencies of the calibration carrier and the communication carrier avoid interference between the calibration carrier and the communication carrier.

19. The method of claim 9 further comprising the steps of calibrating the first active array to be in phase with the calibration carrier, followed by calibrating the second active array to be in phase with the calibration carrier, followed by calibrating the communication carrier, by applying the correction factor to the calibration carrier, through the first active array, and the second active array.

20. The method of claim 13 wherein the step of calibrating the first and the second active arrays comprises at least one of calibrating each of the elements one at a time and blinking each element at 0 degrees and at 180 degrees in order to calibrate each element.

* * * * *